US008689239B2

(12) United States Patent  
Taylor et al.

(10) Patent No.: US 8,689,239 B2  
(45) Date of Patent: Apr. 1, 2014

(54) DYNAMIC EVENT COLLECTION AND STRUCTURED STORAGE

(75) Inventors: John Anthony Taylor, Bellevue, WA (US); Igor Sedukhin, Issaquah, WA (US); Gilles C. J. A. Zunino, Kirkland, WA (US); Amol Sudhakar Kulkarni, Bothell, WA (US); Haoran Andy Wu, Sammamish, WA (US); Sumit Mohanty, Redmond, WA (US); Kenneth D. Wolf, Seattle, WA (US); Timothy Glenn MacNary, Bellevue, WA (US); Michael Josef Krejcik, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 12/469,473

(22) Filed: May 20, 2009

(65) Prior Publication Data

US 2010/0299678 A1  Nov. 25, 2010

(51) Int. Cl.  
*G06F 9/06* (2006.01)

(52) U.S. Cl.  
USPC .......................... 719/318; 705/7.26; 705/7.27

(58) Field of Classification Search  
None  
See application file for complete search history.

(56) References Cited

U.S. PATENT DOCUMENTS

| | | | | |
|---|---|---|---|---|
| 5,237,684 | A * | 8/1993 | Record et al. | 719/318 |
| 5,892,898 | A * | 4/1999 | Fujii et al. | 714/57 |
| 5,987,422 | A * | 11/1999 | Buzsaki | 705/7.13 |
| 7,237,232 | B2 | 6/2007 | Smith | |
| 7,457,872 | B2 | 11/2008 | Aton | |
| 7,502,845 | B2 | 3/2009 | Sanghvi | |
| 2002/0156882 | A1 | 10/2002 | Natarajan | |
| 2005/0010930 | A1 | 1/2005 | Vaught | |
| 2005/0203952 | A1 | 9/2005 | Deily | |
| 2006/0031523 | A1 * | 2/2006 | Morris | 709/227 |
| 2006/0074714 | A1 * | 4/2006 | Aziz et al. | 705/2 |
| 2009/0013047 | A1 * | 1/2009 | Adreon et al. | 709/206 |
| 2009/0055838 | A1 | 2/2009 | Sedukhin | |

OTHER PUBLICATIONS

Brian Rush, Event management/logging with publisher subscriber pattern, Oct. 21, 2005, pp. 1-7.*  
Author Unknown; "Class Feedlet"; 2009; pp. 1-8; http://jikesrvm.org/docs/api/org/jikesrvm/tuningfork/Feedlet.html.  
Vorbehalten; "Event Framework"; 2007; pp. 1-3; http://www.activemath.org/Software/Events.  
Author Unknown; "How to View and Manage Event Logs in Event Viewer in Windows XP"; May 2007; pp. 1-5; http://support.microsoft.com/kb/308427.

(Continued)

*Primary Examiner* — H S Sough  
*Assistant Examiner* — Syed Roni  
(74) *Attorney, Agent, or Firm* — David Andrews; Ben Tabor; Micky Minhas

(57) ABSTRACT

In one embodiment, a computer system accesses an event associated with an activity, where the activity has been executed by a runtime as part of a software application. The runtime includes a software hook configured to listen for event stream operation indications from the user. The computer system tags the accessed event with an additional portion of identification information that uniquely identifies the executed activity. The computer system receives an event stream operation indication from the user indicating that event transmission for an identified event stream is to be dynamically enabled or disabled and identifies the user-indicated event stream using the tagged identification information. The computer system also dynamically performs the indicated event stream operation on the identified event stream according to the user's indication.

20 Claims, 4 Drawing Sheets

(56) References Cited

OTHER PUBLICATIONS

Author Unknown; "Mate: Event Driven Framework for Flex"; 2009; pp. 1-7; http://www.flashmagazine.com/reviews/detail/mate_event_driven_framework_for_flex/.

Author Unknown; "Monitoring Events"; 2006; pp. 1-2; http://publib.boulder.ibm.com/infocenter/dmndhelp/v6rmx/index.jsp?topic=/com.ibm.wbit.help.cei.ui.doc/topics/tcei.html.

* cited by examiner

DYNAMIC EVENT COLLECTION AND STRUCTURED STORAGE

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

One type of software is referred to as a "runtime". A runtime generally provides underlying functionality that can be used by multiple different applications that run on a computing system. Some runtimes may be configured to execute activities. An activity generally represents a unit of executable code that may be part of a software application or part of an application function. As activities are executed, the runtime may be configured to track when each activity was executed and, in some cases, identify program state before and after execution.

BRIEF SUMMARY

Embodiments described herein are directed to performing operations based on applied event tags and storing received events such that the stored events form a relational model contextually representing how each of the activities of the application was executed. In one embodiment, a computer system accesses an event associated with an activity, where the activity has been executed by a runtime as part of a software application. The runtime includes a software hook configured to listen for event stream operation indications from the user. The computer system tags the accessed event with an additional portion of identification information that uniquely identifies the executed activity. The computer system receives an event stream operation indication from the user indicating that event transmission for an identified event stream is to be dynamically enabled or disabled and identifies the user-indicated event stream using the tagged identification information. The computer system also dynamically performs the indicated event stream operation on the identified event stream according to the user's indication.

In other embodiments, a computer system accesses an event associated with an activity, where the activity has been executed by a runtime as part of a software application. The runtime includes a software hook configured to listen for event stream operation indications from the user. The computer system tags the accessed event with an additional portion of identification information that uniquely identifies the executed activity. The computer system also stores each received event in a structured manner, so that the stored events form a relational model contextually representing how each of the activities of the application was executed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
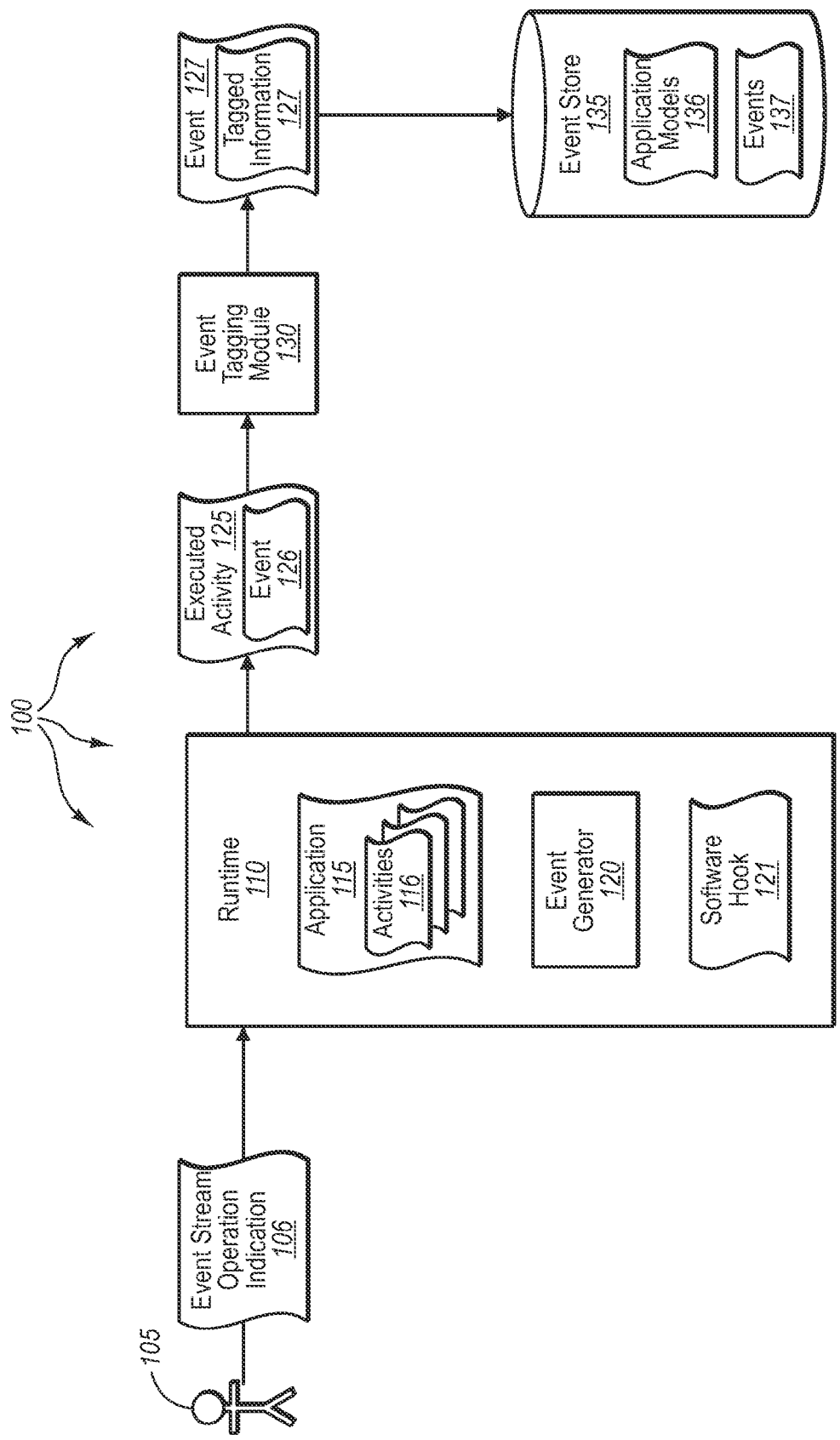
FIG. 1 illustrates a computer architecture in which embodiments of the present invention may operate including performing operations based on applied event tags.

Embodiments described herein are directed to performing operations based on applied event tags and storing received events such that the stored events form a relational model contextually representing how each of the activities of the application was executed. In one embodiment, a computer system accesses an event associated with an activity, where the activity has been executed by a runtime as part of a software application. The runtime includes a software hook configured to listen for event stream operation indications from the user. The computer system tags the accessed event with an additional portion of identification information (e.g. an activity identifier such as a globally unique identifier (GUID)) that uniquely identifies the executed activity. The computer system receives an event stream operation indication from the user indicating that event transmission for an identified event stream identified using a predetermined event stream identifier is to be dynamically enabled or disabled with reference to the predetermined event stream identifier. The computer system also dynamically performs the indicated event stream operation on the identified event stream according to the user's indication.

In other embodiments, a computer system accesses an event associated with an activity, where the activity has been executed by a runtime as part of a software application. The runtime includes a software hook configured to listen for event stream operation indications from the user. The computer system tags the accessed event with an additional portion of identification information that uniquely identifies the executed activity. The computer system also stores each received event in a structured manner, so that the stored events form a relational model contextually representing how each of the activities of the application was executed.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, as discussed in greater detail below. Embodiments within the scope of the present invention also include physical and other computer-readable storage media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes runtime 110. Runtime 110 may be any type of software execution environment designed to provide underlying functionality that can be used by different applications (e.g. 115) running on a computing system. In some cases, runtime 110 may include a continuation-based runtime which is configured to execute activities 116. Such activities may be executed in a customized manner, such as in a workflow. Activities 116 may also be able to create child activities which operate as part of the parent activity. Each activity, in turn, may include multiple work items or pulses of work. As these activities and corresponding work items are executed, various events (event 126) may occur or may be generated (e.g. by event generator 120) as part of the execution process.

In some cases, applications output a stream of events identifying the various events that occur as a result of execution of the application. That is, each time a work item is executed, for example, an event related to that work item is generated indicating that the work associated with that item has been completed (or has at least changed state). These events, either individually, or as part of a stream, may be tagged with additional information by event tagging module 130. This additional information may include an application identifier (ID), a global unique identifier (GUID), a virtual path, a web site name, or any other type of identification information that identifies the application, the activity, the work item or any combination thereof. Users or consumers of these event streams may use the additional information to identify which application or activity the event came from, why the event was generated or how the execution of an individual activity or work item fits into the broader execution of the application. As such, the additional information tagged to each event may be used in debugging to determine how, where, why and in which context a particular activity or work item was executed.

These events (and the corresponding event streams) may be stored in event store 135. The stored events may be stored according to a particular application model 136. That is, the events may be stored in a different manner depending on which application the events come from. Events may be stored in event store 135 in such a manner that the execution of the application or activity may be viewed as a whole or recreated to determine the context of each work item's execution. By storing the events in such a structured manner (and, at least in some cases, according to an application model), a model of the runtime may be generated representing the execution of each individual activity and/or work item. This and many other aspects of event tagging and structured event storage will be explained in greater detail below with regard to method 200 of FIG. 2.

Figure 2:
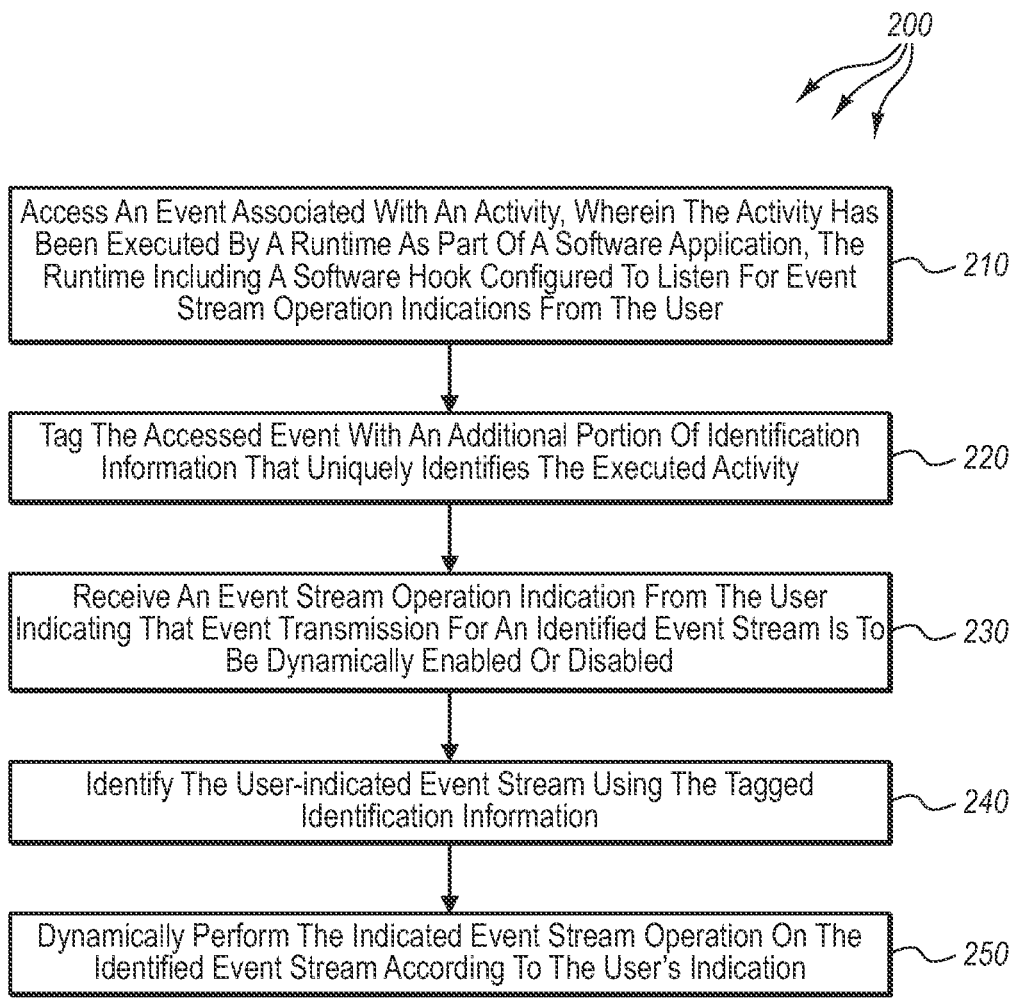
FIG. 2 illustrates a flowchart of an example method for performing operations based on applied event tags.

FIG. 2 illustrates a flowchart of a method 200 for performing operations based on applied event tags. The method 200 will now be described with frequent reference to the components and data of environment 100.

Method 200 includes an act of accessing an event associated with an activity, wherein the activity has been executed by a runtime as part of a software application, the runtime including a software hook configured to listen for event stream operation indications from the user (act 210). For example, event generator 120 may access an event associated with activity 116, where the activity was executed by runtime 110 as part of application 115. Runtime 110 may include software hook 121 which is configured to listen for event stream operation indication 106 from user 105. In some cases, software hook 121 may refer to an event transmitter or an event bus. Event stream operation indication 106 may indicate user 105's desire to receive events related to an identified event stream. Software hook 121 is configured to listen for such indications and start sending the indicated event stream to the user upon receiving the indication 106. Indication 106 may indicate one or a plurality of different event streams that the user desires to receive.

Figure 4:
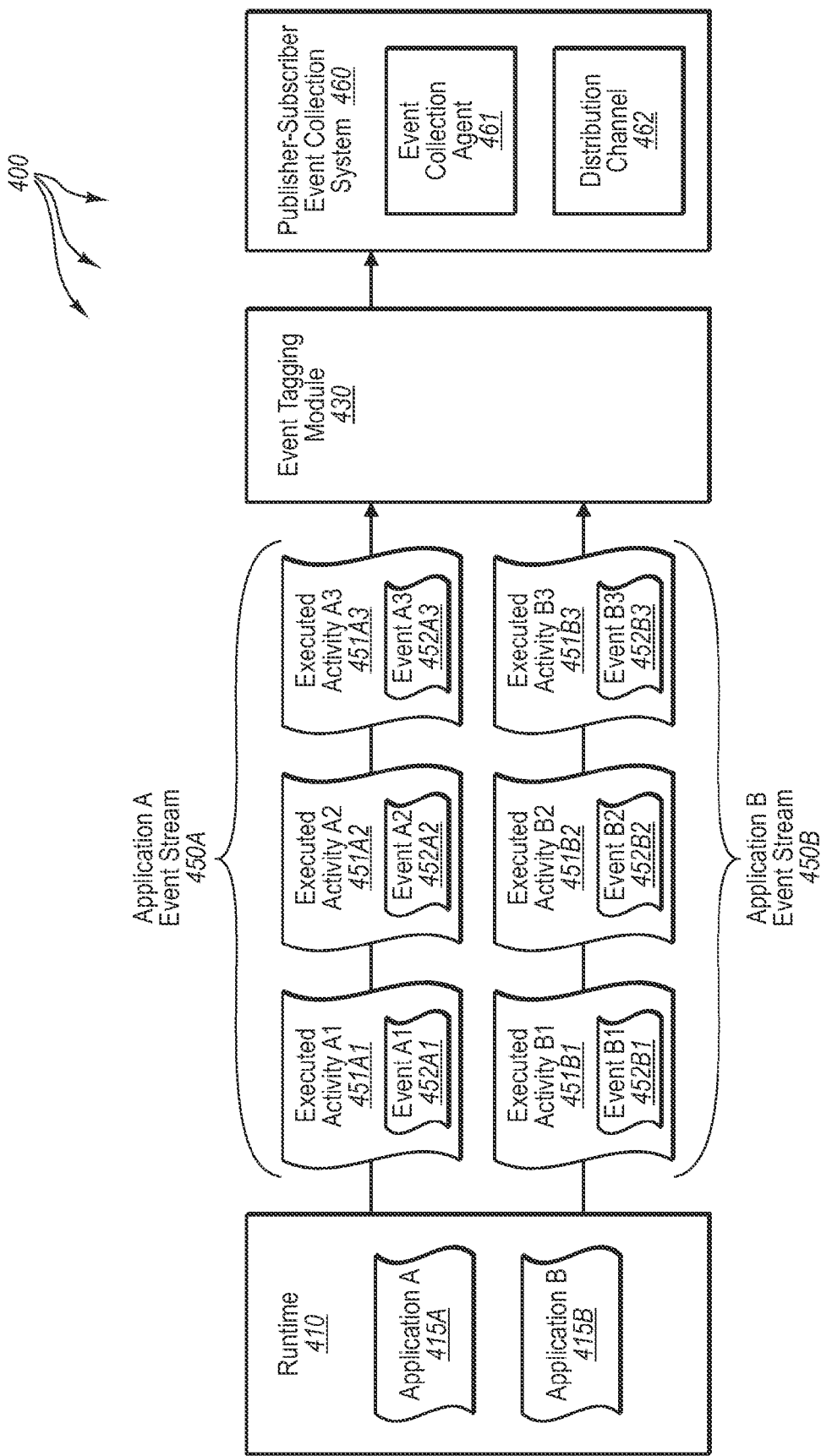
FIG. 4 illustrates a plurality of application event streams.

As illustrated in computer environment 400 of FIG. 4, events may be continually and automatically accessed as the runtime executes by a publisher-subscriber event collection system 460. For example, runtime 410 may execute application A (415A) and, as part of executing application A, execute various activities (three are shown, although it should be understood that more or less than three may be executed). Thus, runtime 410 may execute executed activity A1 (451 A1), executed activity A2 (451 A2) and executed activity A3 (451 A3). Each executed activity may include a corresponding event (e.g. event A1 (452 A1), event A2 (452 A2) and event A3 (452 A3, respectively). Moreover, each individual activity may emit multiple events. These events comprise application event stream 450A. This event stream may be sent to event tagging module 430 where each of the events may be tagged with additional information. The event stream may then be distributed to those users that have indicated (e.g. via indication 106) that they wish to subscribe to or receive event stream 450A.

In some cases, the publisher-subscriber event collection system 460 may include an event collection agent 461 and a distribution channel 462. Using the distribution channel, the event collection agent may collect and distribute event streams to those that have indicated an interest in receiving them. The distribution channel may, in some cases, be a lossy, low-latency, low-overhead channel. Such a distribution channel would have low associated costs due to its described nature. The publisher-subscriber event collection system may comprise an event transmission fabric such as an event tracing software program. Other pub-sub programs may also be used including message queuing programs, user datagram protocol (UDP), database read/write application and other such programs.

Publisher-subscriber system 460 may be configured to accept event stream operation indications from multiple different users and distribute the indicated event streams to those users. In some instances, multiple users may be subscribed to the same event stream. In cases where the publisher-subscriber system determines that no user is subscribed to an event's corresponding event stream, the system may discard the events. Similarly, in cases where the publisher-subscriber system determines that no user is subscribed to an event's corresponding event stream, the event may simply not be emitted at all. In some embodiments, the publisher-subscriber system 460 may also be configured to automatically subscribe a user to an event stream upon determining that the event stream is being emitted from an application that provides substantially similar functionality to an application to whose event stream the user is currently subscribed.

From a given stream of events, a user may be able to determine how the activity stream's associated application or activity is behaving. As an application or activity is being executed, each corresponding generated event may describe a small portion of the execution. From each small portion, a user may be able to piece together various details of application behavior. The user may be able to determine execution context for each activity, identify state changes that occurred, and observe where complications or errors arose and possibly how to fix them. As will be explained below, the tagged information 127 allows the user to identify a great deal of additional context information associated with the event.

Method 200 includes an act of tagging the accessed event with an additional portion of identification information that uniquely identifies the executed activity (act 220). For example, event tagging module 130 may tag event 126 with an additional portion of identification information that uniquely identifies executed activity 125. In some cases, the added identification information identifies not only which activity was executed, but also which sub-component of the application or activity emitted the event. For instance, the added identification information may identify which work item(s) the event is associated with. The added identification information may include any type of identification information including application ID, GUID, virtual path, web site name, application domain ID and process ID. The event tagging module may add one or multiple different portions of identification information. In some cases, the amount of information or which specific identifiers are used is user-configurable or may be determined on a per-application/per-activity basis.

In some embodiments, additional information may be added to an event stream identifier in the form of a "level" indicator. The level may, for example, include "error," "warning," "info" or any other numerical or textual identifier. In some cases, a user may be able to specify that a stream of events is to be enabled with a combination of a predefined textual name and one of a plurality of different predefined levels. Thus, in one example, a combined identifier may include "Event 1, Error," or "Event 3, Info," etc. It will be understood that these examples are merely illustrative, and that any different name and level combination may be used. Moreover, the above formatting was chosen arbitrarily and may be configured differently in different implementations.

Software hook 121 may be configured to identify various events or event streams using the tagged information. Thus, a user may indicate that a particular event stream is to be dynamically enabled or disabled (i.e. the user will begin or cease to receive the event stream) by identifying the event or event stream's corresponding identification item. Accordingly, the user may simply indicate that the user wishes to cease receiving events from application A event stream 450A and begin receiving events from application B event stream 450B.

Method 200 includes an act of receiving an event stream operation indication from the user indicating that event transmission for an identified event stream is to be dynamically enabled or disabled (act 230). For example, runtime 110 may receive event stream operation indication 106 from user 105 indicating that event transmission for application B event stream 450B is to be enabled or disabled. As mentioned above, the event stream may be a named entity within the system. Naming or otherwise identifying the event stream (e.g. with an event level) gives the user (or other computer system) something to reference when enabling or disabling event transmission for a given event stream. Furthermore, software hook 121 may receive this indication and, based on which stream was identified in the indication, stop or start the publishing of the event stream to that user. Unless otherwise indicated by a user, the publisher-subscriber system 460 will continue to publish the events of an event stream to those users that are subscribed until the activity has completed its execution and no further related events are generated.

In cases where a particular event stream is disabled, application design considerations may be taken to ensure that the necessary activity to activity transfer events are still emitted, such that a desired level of context is attainable within the collected events for the streams that remain enabled. Consideration for such an issue may be justified when the event stream is referred to with a structured name in the form of "name+level" (as described above), where the name is enabled and the level is set to some value that causes only a limited number of the events to be emitted. The application design may be such that within a set level, the necessary activity to activity transfer events are also emitted for the desired level of context.

As used herein, the context describes a particular event in relationship to other events. As all the events in an event stream share the same (or substantially same) activity identifier and in-order time stamps, each event tagged with an activity identifier may be clearly seen in relationship to other events with that identifier. In order to capture a wide context the event source may generate an activity to activity transfer event such that activities can be related to cascading activities in the runtime. In some cases, the activity to activity transfer event includes the two activity identifiers captured as data in an event of type transfer in the same event stream. Thus, given the activity identifiers tagged on individual events and the generated transfer events, the full context for an event can be built up.

Method 200 also includes an act of identifying the user-indicated event stream using the tagged identification information (act 240). For example, software hook 121 may analyze events or event streams looking for various types of identification information added by event tagging module 130. Upon finding tagged identification information that matches information indicated in the event stream operation indication 106, the software hook performs the operation identified in the indication. Operations may include publishing the identified events to the user, ceasing publication, ignoring, discarding, forwarding, storing, or any other operation that may be performed in connection with an event.

Method 200 includes an act of dynamically performing the indicated event stream operation on the identified event stream according to the user's indication (act 250). For example, runtime 110 may dynamically perform the indicated event stream operation on the event steam identified using the tagged information. Dynamic performance of the operation allows the stream to be published (or otherwise acted upon) on-the-fly, without restarting the application or any of its associated activities. Events (and event streams) may be captured and stored by the runtime and/or by the user in event store 135. The events may be stored in a structured manner, such that the stored events form a relational model of the runtime execution of the application. This relational model may be used in monitoring, troubleshooting and/or debugging the software application, as each tagged event stored in the persistent store may indicate what the event's corresponding activity was doing at a given point in time during execution. In some cases, the relational model may be different for each different application type, where the relational model corresponds to the application model of the application. Moreover, such a structured format may support a mechanism or tool for dynamically making multiple copies of the same event. Event storage and other related concepts will be explained in greater detail below with regard to method 300 of FIG. 3.

Figure 3:
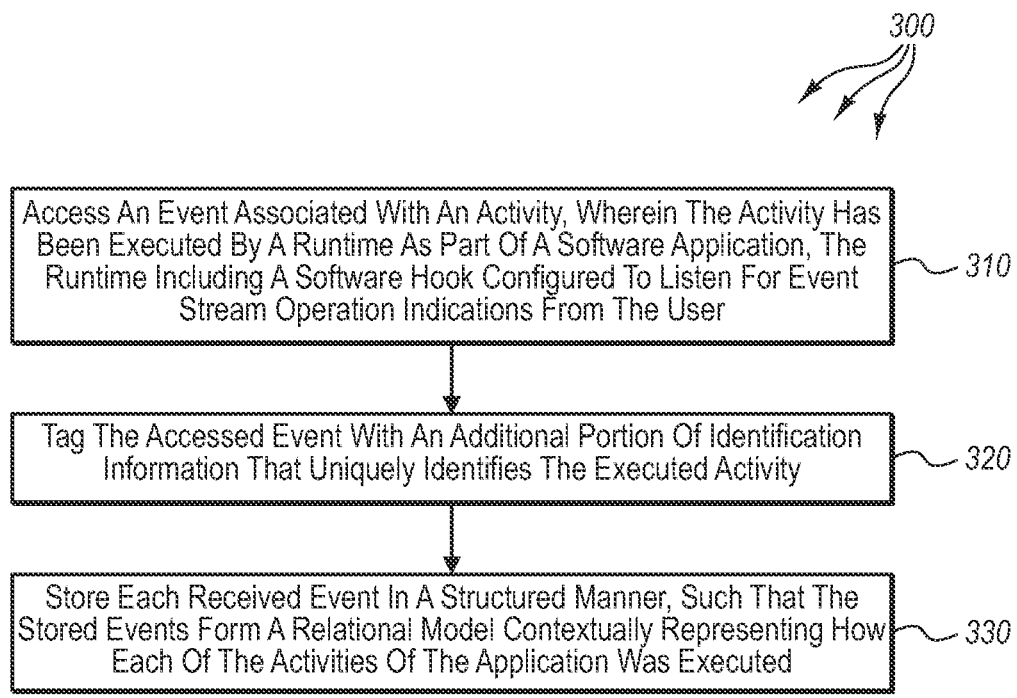
FIG. 3 illustrates a flowchart of an example method for storing received events such that the stored events form a relational model contextually representing how each of the activities of the application was executed.

FIG. 3 illustrates a flowchart of a method 300 for storing received events such that the stored events form a relational model contextually representing how each of the activities of the application was executed. The method 300 will now be described with frequent reference to the components and data of environment 100.

Method 300 includes an act of accessing an event associated with an activity, wherein the activity has been executed by a runtime as part of a software application, the runtime including a software hook configured to listen for event stream operation indications from the user (act 310). For example, event generator 120 may access an event associated with activity 116, where the activity was executed by runtime 110 as part of application 115. Runtime 110 may include software hook 121 which is configured to listen for event stream operation indication 106 from user 105. Event stream operation indication 106 may indicate user 105's desire to receive events related to an identified event stream. Software hook 121 is configured to listen for such indications and start sending (or cause publisher-subscriber system 460 to start sending) the indicated event stream to the user upon receiving the indication 106. Indication 106 may indicate one or a plurality of different event streams that the user desires to receive or otherwise perform an operation on.

Method 300 includes an act of tagging the accessed event with an additional portion of identification information that uniquely identifies the executed activity (act 320). For example, as explained above, event tagging module 430 may tag one or more accessed events with additional identification information that uniquely identifies the executed activity. For instance, if runtime 410 is executing application B (415B), each activity that is executed as part of application B is individually tagged with identification information. The type of tagged information may be different for each executed activity or may be same for an entire stream.

For instance, executed activity B1 (451 B1) may include associated event B1 (452 B1) which may include an added application ID. Executed activity B2 (451 B2) may include associated event B2 (452 B2) which may include an added virtual path. Executed activity B3 (451 B3) may include associated event B3 (452 B3) which may include an added web site name. Additionally or alternatively, each of events B1, B2 and B3 may be tagged with the same application ID, or the same virtual path. Multiple types of identification may be added to the various events in an event stream (e.g. application B event stream 450B). The added information may be the same or different for each event and may be configurable by the user.

Method 300 includes an act of storing each received event in a structured manner, such that the stored events form a relational model contextually representing how each of the activities of the application was executed (act 330). For example, event store 135 may store each received event 126 in a structured manner. The structured storing may allow the stored events to form a relational model contextually representing how each of the activities of the application was executed. For instance, in FIG. 4, if application A was being executed by runtime 410, and the corresponding tagged events were being stored in event store 135, events A1, A2 and A3 may be stored in such a manner that the events form a relational model contextually representing how each of activities A1, A2 and A3 of application A was executed. Such a relational model may be more well-defined in cases where the executed application has hundreds or thousands of associated activities, each with corresponding tagged events. Each of these tagged events may be stored in such a manner that a developer or other user may be able to analyze the events and, using the tagged information along with the inherent event information, may be able to observe the behavior of the application on a very small level of granularity.

Event store 135 may further be configured to store application models. Moreover, the event store may store events in a manner corresponding to the application being executed by the runtime. Thus, if application 115 was generated using or is consistent with a specific application model, the events may be stored in a like manner using a storage model that corresponds to the application model. In some cases, user 105 may access the stored events 137 to perform a user-initiated action using the stored events. For example, a user may access the stored events to perform a debugging operation to determine where a particular problem occurred. A user could also access the stored events to form a contextual model of the execution of the runtime during execution of a particular application. Such a contextual model would provide an indication of the application's overall behavior during execution.

It should also be noted that, while embodiments described above define a relational model specific to the data of the events the model is emitting, there may be a commonality between various different relational models. For instance, the context for a given event may be established using the combination of activity identifiers tagged on individual events and the ordering in which the events occur in the event stream. Moreover, the context for a given event may be established using an event stream's activity to activity transfer events (described above). Thus, a generic abstract model may exist that is common to many different domain specific relational models. Such commonality may indicate a correlation between events, event execution in a given order, activities and the correlation of activities to other activities.

Accordingly, additional identification information may be added to events or event streams that allow a user to identify where and how each activity was executed. Moreover, the tagged events that include the additional identification information can be stored in a structural manner such that the stored events form a relational model contextually representing how each of the activities of the application was executed. These stored events may be accessed and used to determine how a particular application or activity behaved during execution by the runtime.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for performing operations based on applied event tags, the method comprising:

an act of accessing a plurality of events from one or more event streams associated with one or more activities, wherein the activities have been executed by one or more continuation based runtimes as part of software applications, the continuation based runtimes including software hooks configured to listen for event stream operation indications from a user, the continuation based runtimes being specialized software modules configured to execute activities in a customized manner as workflows, wherein each activity includes one or more pulses of work, and wherein each time a pulse of work is executed, an event related to the pulse of work is generated indicating that the pulse of work has been completed or changed state;

an act of tagging each of the events in the plurality of accessed events, after the events have been generated with an additional portion of identification information that uniquely identifies an application from which the event was emitted;

an act of receiving an event stream operation indication from a user indicating that event distribution to the user for an identified event stream is to be dynamically enabled, the event stream operation indication specifying an application identifier such that the identified event stream is an event stream of events emitted from a given application;

an act of identifying events from among the plurality of events corresponding to the application identifier; and an act of distributing events from among the plurality of events corresponding to the application identifier to the user.

2. The method of claim 1, wherein events are continually and automatically accessed as the runtimes execute by a publisher-subscriber event collection system.

3. The method of claim 2, wherein a plurality of users are subscribed to the same event stream.

4. The method of claim 2, further comprising an act of automatically subscribing a user to an event stream upon determining that the event stream is being emitted from an application that provides the same functionality to an application to whose event stream the user is currently subscribed.

5. The method of claim 2, wherein the publisher-subscriber event collection system comprises an event collection agent and a lossy, low-latency, low-overhead channel.

6. The method of claim 1, further comprising an act of storing one or more of the tagged events in a persistent store in a structured manner, such that the stored events form a relational contextual model of the runtime execution of an application.

7. The method of claim 6, further comprising an act of troubleshooting the application using one or more of the tagged events stored in the persistent store, each event being stored in a structural manner such that the events form a relational model contextually representing how each activity corresponding to an event was executed.

8. The method of claim 6, wherein the relational model is different for each different application type.

9. The method of claim 1, wherein the additional portion of identification information includes at least one of the following identification items: application ID, virtual path, web site name, application domain ID or process ID.

10. The method of claim 9, wherein the user indicates that a particular event stream is to be dynamically enabled by identifying an application ID such that a runtime hook is made aware that the user intends to subscribe or unsubscribe from an event stream for a given application.

11. The method of claim 9, wherein at least one of the identification items identifies which sub-component of the application emitted the event.

12. The method of claim 1, wherein events from a plurality of applications are sent to a user upon determining that the user has indicated that the user desires to receive corresponding events for each of the plurality of applications.

13. The method of claim 1, further comprising an act of monitoring an event stream to determine from the stream how the event stream's associated application is behaving.

14. The method of claim 1, wherein an emitted event is discarded upon determining that no user is subscribed to the event's corresponding event stream.

15. A computer program product for implementing a method for storing received events such that the stored events form a relational model contextually representing how each activities of an application was executed, the computer program product comprising one or more computer-readable storage media having stored thereon computer-executable instructions that, when executed by one or more processors of the computing system, cause the computing system to perform the method, the method comprising:

an act of accessing a plurality of events from one or more event streams associated with one or more activities, wherein the activities have been executed by one or more continuation based runtimes as part of software applications, the continuation based runtimes including software hooks configured to listen for event stream operation indications from a user, the continuation based runtimes being specialized software modules configured to execute activities in a customized manner as workflows, wherein each activity includes one or more pulses of work, and wherein each time a pulse of work is executed, an event related to the pulse of work is generated indicating that the pulse of work has been completed or changed state;

an act of tagging each of the events in the plurality of accessed events, after the events have been generated with an additional portion of identification information that uniquely identifies an application from which the event was emitted; and an act of storing events in a structured manner, such that the stored events form a relational model contextually representing how each of the activities of the applications was executed by storing the events according to the additional portion of identification information that uniquely identifies an application from which the event was emitted.

16. The computer program product of claim 15, wherein the events are stored in a persistent store which is further configured to store application models.

17. The computer program product of claim 16, wherein each application model is configured to store events in a manner corresponding to the application being executed by the runtime.

18. The computer program product of claim 15, further comprising accessing one or more of the stored events to perform a user-initiated action using the stored events.

19. The computer program product of claim 15, wherein the tagged information is stored with the event.

20. A computer system comprising the following:

one or more processors;

system memory; and one or more computer-readable storage media having stored thereon computer-executable instructions that, when executed by the one or more processors, causes the computing system to perform a method for performing operations based on applied event tags, the method comprising the following:

an act of accessing a plurality of events from one or more event streams associated with one or more activities, wherein the activities have been executed by one or more continuation based runtimes as part of software applications, the continuation based runtimes including software hooks configured to listen for event stream operation indications from a user, the continuation based runtimes being specialized software modules configured to execute activities in a customized manner as workflows, wherein each activity includes one or more pulses of work, and wherein each time a pulse of work is executed, an event related to the pulse of work is generated indicating that the pulse of work has been completed or changed state;

an act of tagging each of the events in the plurality of accessed events, after the events have been generated with an additional portion of identification information that uniquely identifies an application from which the event was emitted;

an act of receiving an event stream operation indication from a user indicating that event distribution to the user for an identified event stream is to be dynamically enabled, the event stream operation indication specifying an application identifier such that the identified event stream is an event stream of events emitted from a given application;

an act of distributing events from among the plurality of events corresponding to the application identifier to the user; and an act of storing events in a structured manner, such that the stored events form a relational model contextually representing how each of the activities of the applications was executed by storing the events according to the additional portion of identification information that uniquely identifies an application from which the event was emitted.

* * * * *